US010983658B2

(12) United States Patent
Tsai et al.

(10) Patent No.: US 10,983,658 B2
(45) Date of Patent: Apr. 20, 2021

(54) CURSOR CONTROL SYSTEM AND CURSOR CONTROL METHOD

(71) Applicant: Primax Electronics Ltd., Taipei (TW)

(72) Inventors: Cheng-Yi Tsai, Taipei (TW); Ying-Che Tseng, Taipei (TW); Shi-Jie Zhang, Taipei (TW); Che-Yen Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 57 days.

(21) Appl. No.: 16/211,539

(22) Filed: Dec. 6, 2018

(65) Prior Publication Data
US 2020/0097130 A1   Mar. 26, 2020

(30) Foreign Application Priority Data
Sep. 25, 2018   (TW) .................................. 107133646

(51) Int. Cl.
*G06F 3/0481* (2013.01)
*G06F 3/0482* (2013.01)
*G06F 3/14* (2006.01)
*G06F 3/0354* (2013.01)

(52) U.S. Cl.
CPC ........ *G06F 3/0481* (2013.01); *G06F 3/03543* (2013.01); *G06F 3/14* (2013.01)

(58) Field of Classification Search
CPC .............................. G06F 3/0486; G06F 3/0481
See application file for complete search history.

(56) References Cited

U.S. PATENT DOCUMENTS

| 2012/0083208 A1* | 4/2012 | Giles ...................... H04W 4/21 455/41.2 |
| 2012/0083209 A1* | 4/2012 | Giles ................ H04W 12/0802 455/41.2 |
| 2012/0144347 A1* | 6/2012 | Jo ...................... G06F 3/04817 715/863 |
| 2019/0294262 A1* | 9/2019 | Lu ......................... G06F 3/1446 |

* cited by examiner

*Primary Examiner* — Rayeez R Chowdhury
(74) *Attorney, Agent, or Firm* — Kirton McConkie; Evan R. Witt

(57) ABSTRACT

The present invention relates to a cursor control system, including a first electronic device, a second electronic device, and a mouse. The mouse is wirelessly connected to the first electronic device and the second electronic device and may move a cursor on a first working desktop corresponding to the first electronic device or a second working desktop corresponding to the second electronic device. When receiving a drive signal from the mouse, the first electronic device displays a jump image on the first working desktop. When the cursor is moved to the jump image, the mouse may transmit a switching signal to the second electronic device according to a masking signal from the first electronic device, so that the second electronic device can display the cursor on the second working desktop.

13 Claims, 10 Drawing Sheets

CURSOR CONTROL SYSTEM AND CURSOR CONTROL METHOD

FIELD OF THE INVENTION

The present invention relates to a cursor control system, and in particular, to a system capable of helping a user perform cursor movement between a plurality of electronic devices.

BACKGROUND OF THE INVENTION

A mouse is one of common computer peripheral input devices. Because the mouse can be held by a user with a palm to control movement of a cursor of a computer system, which meets intuitive operation behaviors of most of users, the mouse becomes the commonest input device.

Referring to FIG. 1, FIG. 1 is a schematic structural diagram of a conventional computer system. The computer system 1 includes a computer host 11, a computer screen 12, and a mouse 13. The computer host 11 is connected to the mouse 13 and the computer screen 12, and the computer host 11 may be connected to the mouse 13 in a wireless connection manner. The computer screen 12 may display a window 121 and a cursor 122. A function of the mouse 13 is controlling the cursor 122 to move or run due to an operation of a user, so that the computer host 11 executes a corresponding instruction. The mouse 13 includes a main body 131, a left button 132, a right button 133, a scroll wheel 134, and a wireless connection module (not shown in the figure). The left button 132 is disposed on the main body 131 and is located on a left side of the scroll wheel 134, and the left button 132 is exposed outside the main body 131 and may be touched by the user to generate a left button signal. The right button 133 is similar to the left button 132. The right button 133 is disposed on the main body 131 and is located on a right side of the scroll wheel 134, and the right button 133 is also exposed outside the main body 131 and may be touched by the user to generate a right button signal. The scroll wheel 134 is disposed inside the main body 131 and is partially exposed outside the main body 131 and may be toggled by the user to rotate, to generate scroll wheel scrolling data. After the scroll wheel scrolling data is transmitted to the computer host 11, the computer host 11 may perform an up-down scrolling function of the window 121 according to the scroll wheel scrolling data. The wireless connection module is disposed inside the main body 131, and a function of the wireless connection module is establishing a wireless connection between the mouse 13 and the computer system 1. An architecture and basic functions of the conventional computer system 1 are described above.

With the development of technologies, a single computer system cannot meet operation behaviors of a user. Some users have a demand of simultaneously operating a plurality of computer systems. Based on the demand, a Taiwan patent application No. 1630542 proposes a seamless switching method for a plurality of computer hosts. In the method, a single mouse may be used to wirelessly connect to a plurality of computer hosts; a user may move, by using the mouse, a cursor on a first working desktop corresponding to a first computer host; when the cursor is moved to a boundary of the first working desktop, and a movement direction of the cursor faces a direction of a second computer host, the cursor may be displayed on a boundary of a second working desktop corresponding to the second computer host. In this way, operations of the plurality of computer hosts are performed by means of movement of the cursor.

However, the foregoing practice limits that the cursor needs to be moved to a boundary of a working desktop, and consequently, the cursor needs to move for an excessively long distance. For example, if the user intends to click a computer file located at the center of the second working desktop, the user needs to first move the cursor to the boundary of the first working desktop, so that the cursor is displayed on the boundary of the second working desktop, and then the user moves the cursor to the center of the second working desktop. Such a practice requires excessively long time to be taken and easily causes tiredness of the user in operation.

Therefore, a cursor control system and a cursor control method that are capable of improving operation convenience are needed.

SUMMARY OF THE INVENTION

A main objective of the present invention is to provide a cursor control system and a cursor control method, to improve operation convenience.

In a preferred embodiment, the present invention provides a cursor control system, including a first electronic device, a second electronic device, and a mouse. The first electronic device includes a first cursor control module and a first screen capable of displaying a first working desktop, and the second electronic device includes a second cursor control module and a second screen capable of displaying a second working desktop. The mouse is wirelessly connected to the first electronic device and the second electronic device and is used to move a cursor on the first working desktop or the second working desktop. The mouse has a control unit, used to receive a cursor control instruction to output a drive signal corresponding to the cursor control instruction to the first cursor control module or the second cursor control module. When the first cursor control module receives the drive signal, a jump image corresponding to the second working desktop is displayed on the first working desktop, and when the first cursor control module detects that the cursor is moved to the jump image, the first cursor control module transmits a masking signal to the mouse, so that the control unit transmits a switching signal to the second electronic device according to the masking signal, and the second cursor control module displays the cursor on the second working desktop according to the switching signal.

In a preferred embodiment, the present invention further provides a cursor control method, applied to a first electronic device, a second electronic device, and a mouse, where the cursor control method includes the following steps: determining, by the mouse, whether a cursor control instruction is received; outputting, by the mouse, a drive signal corresponding to the cursor control instruction to the first electronic device; displaying, by the first electronic device according to the drive signal, a jump image corresponding to the second electronic device on a first working desktop corresponding to the first electronic device; detecting, by the first electronic device, whether the cursor is moved to the jump image; and transmitting, by the mouse, a switching signal to the second electronic device according to a masking signal from the first electronic device, so that the cursor is displayed on the second working desktop.

In a preferred embodiment, the present invention further provides a cursor control method, applied to a first electronic device, a second electronic device, and a mouse, where the cursor control method includes the following steps: determining, by the mouse, whether a cursor control instruction is received; outputting, by the mouse, a drive signal corretronic device; displaying, by the first electronic device according to the drive signal, a jump image corresponding to the second electronic device on a first working desktop corresponding to the first electronic device; detecting, by the first electronic device, whether the cursor drags electronic information to the jump image; and transmitting, by the mouse, a switching signal to the second electronic device according to a masking signal from the first electronic device, to display the cursor on the second working desktop, and transmitting, by the first electronic device, the electronic information to the second electronic device.

In conclusion, in the cursor control system and the cursor control method in the present invention, a plurality of jump images may be enabled on the first working desktop when a user has a need, and the cursor may be displayed on another corresponding working desktop only by moving the cursor to a jump image. It can be known by comparing the present invention with the conventional technology that in the cursor control system and the cursor control method of the present invention, the cursor does not need to be moved to a boundary of a working desktop. In other words, in the present invention, a distance for which the cursor needs to move may be shortened, to facilitate operation. In addition, in the cursor control system and the cursor control method of the present invention, a jump image may be used to wirelessly transmit electronic information, to replace a practice of transmitting the electronic information by using a device such as a key drive.

DETAILED DESCRIPTION OF THE PREFERRED EMBODIMENT

Figure 1:
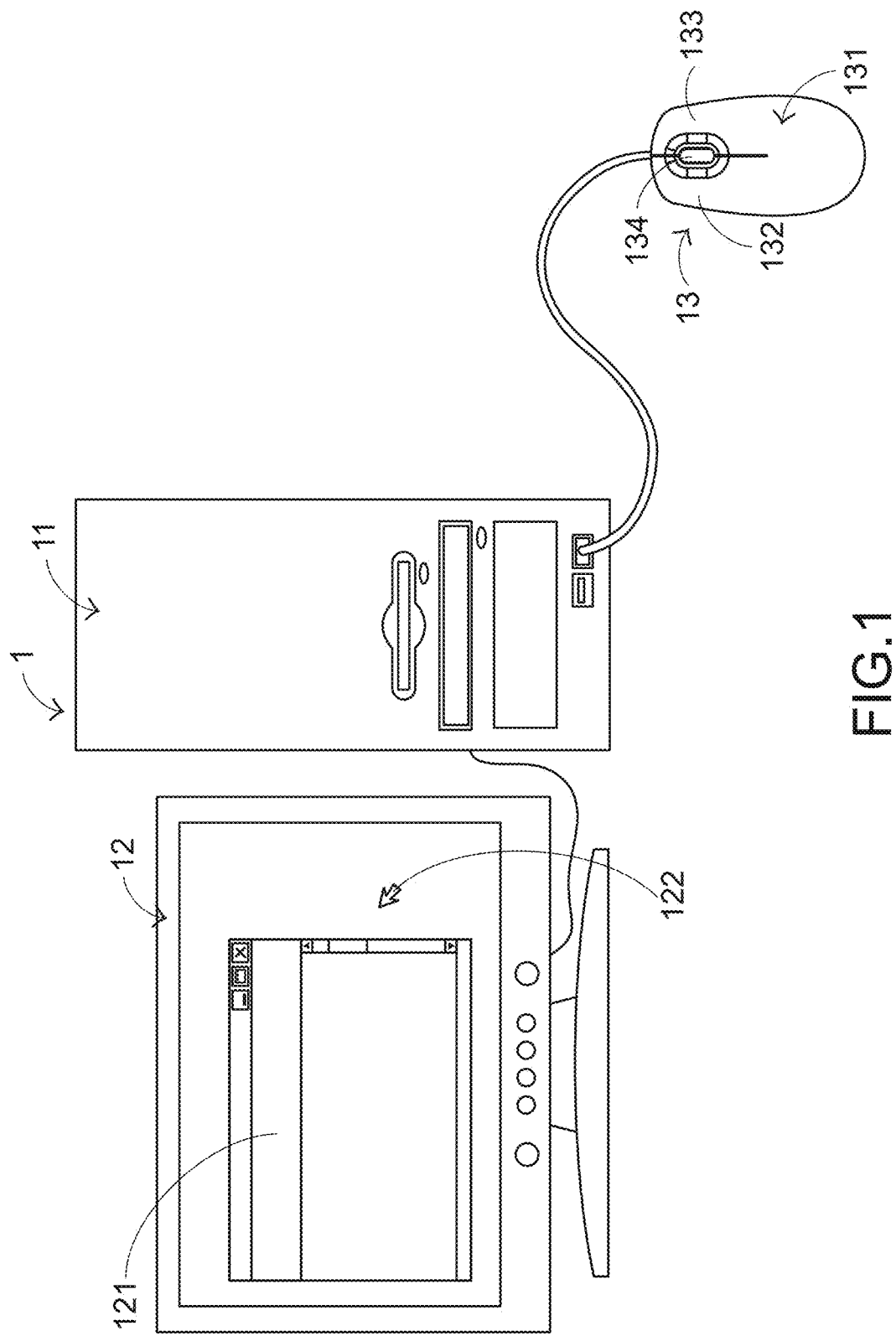
FIG. 1 is a schematic structural diagram of a conventional computer system.
Figure 2:
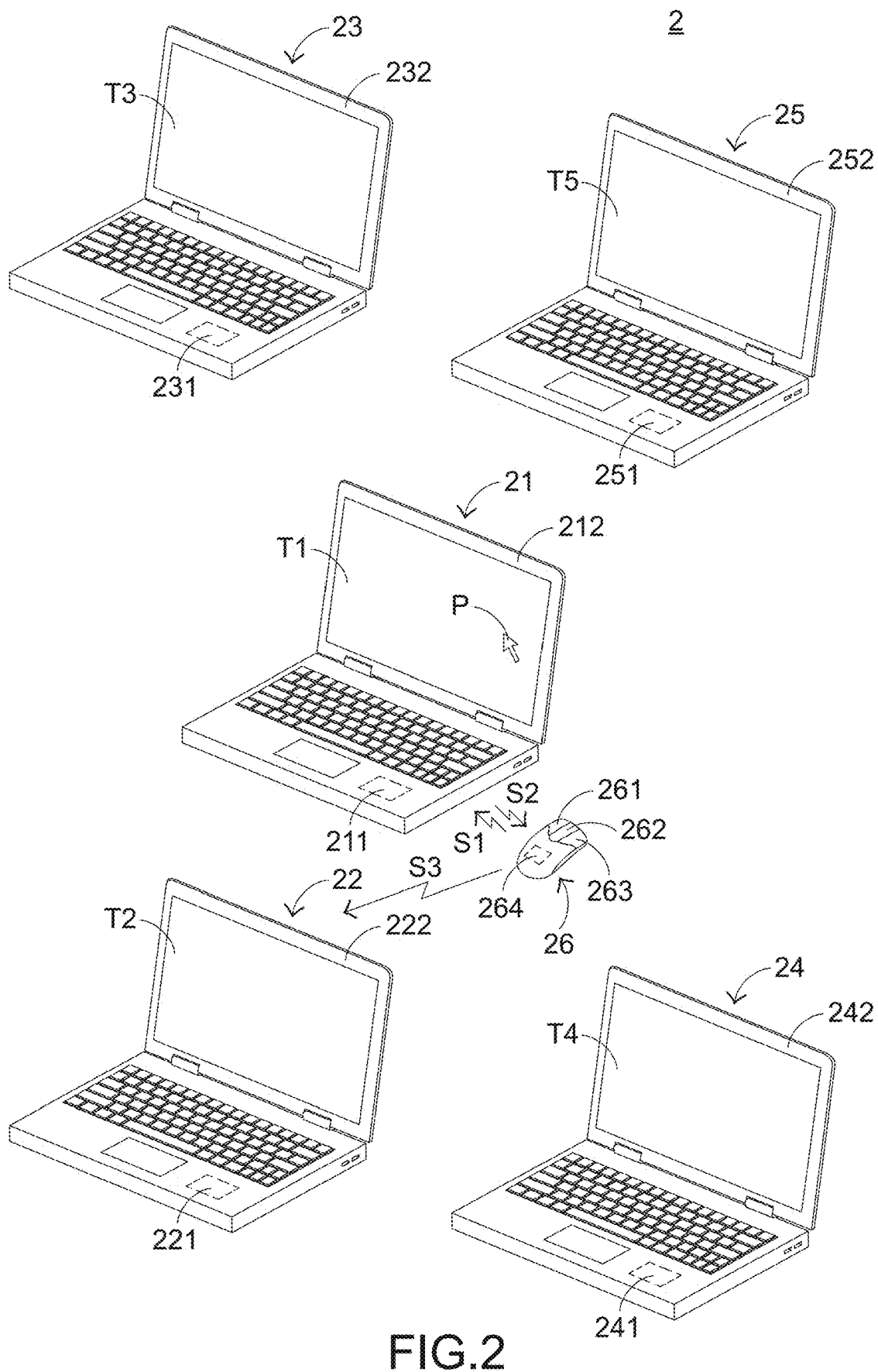
FIG. 2 is a schematic structural diagram of a cursor control system in a first preferred embodiment according to the present invention.

The present invention provides a cursor control system and a cursor control method, to resolve the problem of the conventional technology. First, a structure of the cursor control system is described. Referring to FIG. 2, FIG. 2 is a block schematic diagram of the cursor control system in the first preferred embodiment according to the present invention. The cursor control system 2 includes a first electronic device 21, a second electronic device 22, a third electronic device 23, a fourth electronic device 24, a fifth electronic device 25, and a mouse 26. The first electronic device 21 includes a first cursor control module 211 and a first screen 212, and a function of the first screen 212 is displaying a first working desktop T1 corresponding to the first electronic device 21. Similarly, the second electronic device 22 includes a second cursor control module 221 and a second screen 222, and a function of the second screen 222 is displaying a second working desktop T2 corresponding to the second electronic device 22. The third electronic device 23 includes a third cursor control module 231 and a third screen 232, and a function of the third screen 232 is displaying a third working desktop T3 corresponding to the third electronic device 23. The fourth electronic device 24 includes a fourth cursor control module 241 and a fourth screen 242, and a function of the fourth screen 242 is displaying a fourth working desktop T4 corresponding to the fourth electronic device 24. The fifth electronic device 25 includes a fifth cursor control module 251 and a fifth screen 252, and a function of the fifth screen 252 is displaying a fifth working desktop T5 corresponding to the fifth electronic device 25.

It is shown in FIG. 2 that the second electronic device 22 is located on a front left side of the first electronic device 21, the third electronic device 23 is located on a rear left side of the first electronic device 21, the fourth electronic device 24 is located on a front right side of the first electronic device 21, and the fifth electronic device 25 is located on a rear right side of the first electronic device 21. The first electronic device 21, the second electronic device 22, the third electronic device 23, the fourth electronic device 24, and the fifth electronic device 25 are connected to each other by using an Internet network or in any wireless connection manner. In this preferred embodiment, the first electronic device 21, the second electronic device 22, the third electronic device 23, the fourth electronic device 24, and the fifth electronic device 25 are all notebook computers and are only used as examples. In another preferred embodiment, the first electronic device to the fifth electronic device may be desktop computers, tablet computers, or the like.

The mouse 26 may be wirelessly connected to each of the first electronic device 21 to the fifth electronic device 25 by means of a wireless transmission technology and may move a cursor P on the first working desktop T1, the second working desktop T2, the third working desktop T3, the fourth working desktop T4, or the fifth working desktop T5. The mouse 26 includes a left button 261, a scroll wheel button 262, a right button 263, and a control unit 264. The scroll wheel button 262 is disposed between the left button 261 and the right button 263 and may be toggled by a user to provide a function of a scroll wheel. A function of the control unit 264 is receiving a cursor control instruction from the user to output a drive signal S1 corresponding to the cursor control instruction to the first cursor control module 211, the second cursor control module 221, the third cursor control module 231, the fourth cursor control module 241, or the fifth cursor control module 251. In this preferred embodiment, the left button 261, the scroll wheel button 262, and the right button 263 are touch buttons and may form, on the mouse 26, a touch interface, which can detect a gesture of the user. When the touch interface receives a gesture corresponding to the cursor control instruction, the control unit 264 may output the drive signal S1 corresponding to the cursor control instruction. This is only used as an example, and the present invention is not limited thereto. In another preferred embodiment, a trigger button corresponding to the cursor control instruction may be disposed on the mouse, to generate a drive signal, or a combination button corresponding to the cursor control instruction may be disposed on the mouse, to generate a drive signal.

Figure 3:
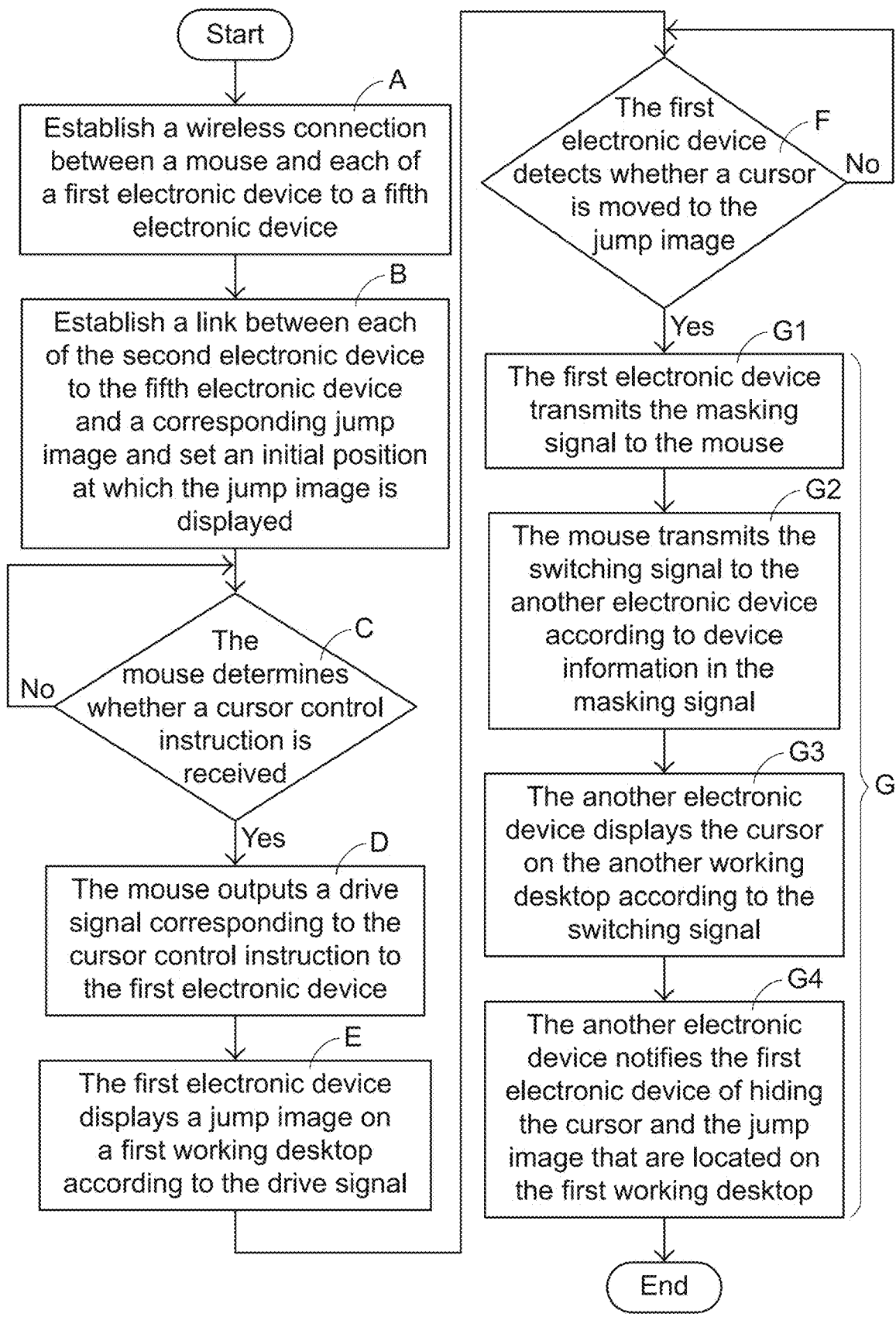
FIG. 3 is a block flowchart of a cursor control method in the first preferred embodiment according to the present invention.

The following describes a cursor control method performed by the cursor control system 2 of the present invention. Referring to FIG. 3, FIG. 3 is a block flowchart of a cursor control method in the first preferred embodiment according to the present invention. The method of the present invention includes the following steps:

Step A: Establish a wireless connection between a mouse and each of a first electronic device to a fifth electronic device.

Step B: Establish a link between each of the second electronic device to the fifth electronic device and a corresponding jump image and set an initial position at which the jump image is displayed.

Step C: The mouse determines whether a cursor control instruction is received.

Step D: The mouse outputs a drive signal corresponding to the cursor control instruction to the first electronic device.

Step E: The first electronic device displays a jump image on a first working desktop according to the drive signal.

Step F: The first electronic device detects whether a cursor is moved to the jump image.

Step G: The mouse transmits a switching signal to another electronic device according to a masking signal from the first electronic device, to display the cursor on another working desktop.

Step G includes the following steps:

Step G1: The first electronic device transmits the masking signal to the mouse.

Step G2: The mouse transmits the switching signal to the another electronic device according to device information in the masking signal.

Step G3: The another electronic device displays the cursor on the another working desktop according to the switching signal.

Step G4: The another electronic device notifies the first electronic device of hiding the cursor and the jump image that are located on the first working desktop.

In step C, when it is determined that the mouse receives the cursor control instruction, perform step D; otherwise, perform step C again. In step F, when the first electronic device detects that the cursor is moved to the jump image, perform step G; otherwise, perform step F again. In a preferred practice, it may be set in step F that if the first electronic device does not detect that the cursor is moved to the jump image within a preset time period, the jump image is hidden.

The following describes a running situation of the cursor control system 2 of the present invention. Referring to both FIG. 2 and FIG. 3, first, in the method of the present invention, perform step A: Establish a wireless connection between the mouse 26 and each of the first electronic device 21 to the fifth electronic device 25 by means of a wireless transmission technology. The wireless transmission technology is, for example, a Bluetooth connection technology, a WiFi connection technology, a 2.4 G connection technology, or an Internet of Things (IOT) connection technology. After the wireless connection between the mouse 26 and each of the first electronic device 21 to the fifth electronic device 25 is established, perform step B: Establish a link between each of the second electronic device 22 to the fifth electronic device 25 and one of corresponding jump images K2 to K5 (refer to FIG. 4), and set initial positions at which the jump images K2 to K5 are displayed.

Step B is performing corresponding setting in each of the electronic devices 21 to 25. For example, a link between the second electronic device 22 and the corresponding jump image K2 is set in the first electronic device 21, and the initial position at which the jump image K2 is displayed is located on a front left side of the cursor P according to a position relationship between the first electronic device 21 and the second electronic device 22. The third electronic device 22 to the fifth electronic device 25 and the corresponding jump images K3 to K5 are similar to the foregoing descriptions and therefore are not described in detail. After setting of the first electronic device 21 is completed, same setting is performed on the second electronic device 22 to the fifth electronic device 25, and after setting of each of the electronic devices 21 to 25 is completed, step B is completed. It should be noted that step B also includes setting related to a website of each of the electronic devices 21 to 25, and the plurality of electronic devices 21 to 25 may be made to communicate with each other, to learn of a website of another electronic device. Related details thereof are well known to a person skilled in the art and therefore are not described in detail.

After step B is completed, the user may start to use the mouse 26 to perform basic operations, such as those stated in the conventional technology, on the first electronic device 21. In this case, the cursor control system 2 starts to perform step C: The control unit 264 of the mouse 26 determines whether the cursor control instruction is received. When the user intends to operate the second electronic device 22 (that is, the cursor P needs to be moved onto the second working desktop T2 corresponding to the second electronic device 22), the user may make, in a touch interface formed by the left button 261, the scroll wheel button 262, and the right button 263, a gesture (the gesture is, for example, simultaneously pressing the left button 261, the scroll wheel button 262, and the right button 263) defined by the mouse 26 as the cursor control instruction. In this case, the control unit 264 determines, in step C, that the cursor control instruction is received. Therefore, the control unit 264 performs step D: Output the drive signal S1 corresponding to the cursor control instruction to the first electronic device 21 currently operated, to notify the first electronic device 21 that the plurality of jump images K2 to K5 needs to be enabled.

Figure 4:
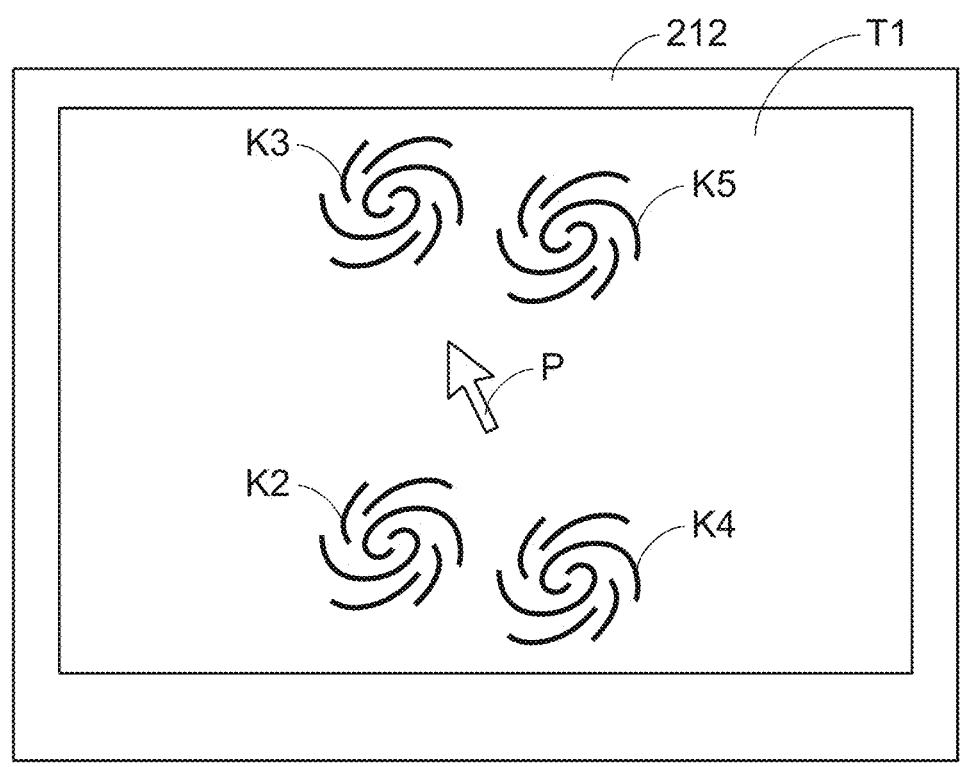
FIG. 4 is a schematic structural diagram of displaying a jump image on a first screen of the cursor control system in the first preferred embodiment according to the present invention.

Referring to all FIG. 2, FIG. 3, and FIG. 4, FIG. 4 is a schematic structural diagram of displaying a jump image on a first screen of the cursor control system in the first preferred embodiment according to the present invention. When the first electronic device 21 receives the drive signal S1, perform step E: Display the plurality of jump images K2 to K5 on the first working desktop T1 according to the drive signal S1. On the first working desktop T1, the jump image K2 corresponding to the second electronic device 22 is displayed on a front left side of the cursor P, the jump image K3 corresponding to the third electronic device 23 is displayed on a rear left side of the cursor P, the jump image K4 corresponding to the fourth electronic device 24 is displayed on a front right side of the cursor P, and the jump image K5 corresponding to the fifth electronic device 25 is displayed on a rear right side of the cursor P, as shown in FIG. 4. It can be seen from FIG. 2 and FIG. 4 that relative positions of the plurality of jump images K2 to K5 and the cursor P correspond to the second electronic device 22 to the fifth electronic device 25 and the first electronic device 21. Such a configuration helps the user perform intuitive operations. After the plurality of jump images K2 to K5 is displayed on the first working desktop T1, the first electronic device 21 performs step F: Detect whether the cursor P is moved to any one of the jump images K2 to K5.

The user operates the mouse 26 to move the cursor P to the jump image K2, the first electronic device 21 may perform step G. An action that the cursor P is moved to the jump image K2 may be regarded as selecting, by the user, the jump image K2 corresponding to the second electronic device 22. First, the first electronic device 21 may learn, according to the selected jump image K2, that an electronic device to be operated by the user is the second electronic device 22. Therefore, the first electronic device 21 generates a masking signal S2 corresponding to the second electronic device 22 and transmits the masking signal S2 to the mouse 26, that is, performs step G1. The masking signal S2 contains device information corresponding to the second electronic device 22. After the mouse 26 receives the masking signal S2, the control unit 264 performs step G2: It is learned according to the device information in the masking signal S2 that an electronic device that needs to be wirelessly connected is the second electronic device 22; therefore, a switching signal S3 is transmitted to the second electronic device 22.

Figure 5:
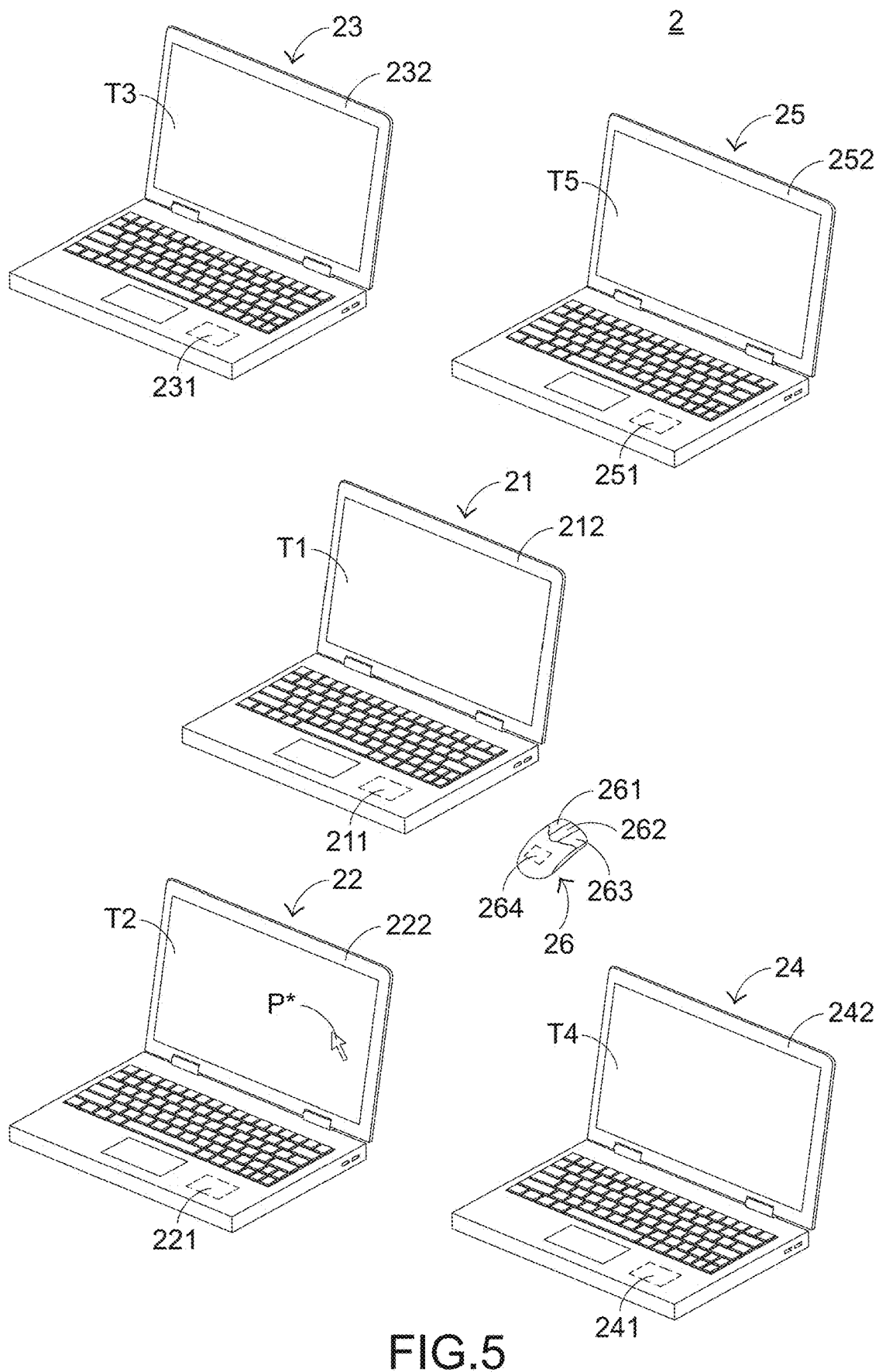
FIG. 5 is a schematic structural diagram of displaying a cursor on a second screen of the cursor control system in the first preferred embodiment according to the present invention.

Referring to all FIG. 2, FIG. 3, and FIG. 5, FIG. 5 is a schematic structural diagram of displaying a cursor on a second screen of the cursor control system in the first preferred embodiment according to the present invention. Then, perform G3: after the second electronic device 22 receives the switching signal S3, the second electronic device 22 displays a cursor P* on the second working desktop T2 according to the switching signal S3. At last, perform G4: the second electronic device 22 notifies the first electronic device 21 of hiding the cursor P and the plurality of jump images K2 to K5 that are located on the first working desktop T1. The method in the present invention is completed.

It should be noted that first, step G4 may be performed after the second electronic device 22 receives the switching signal S3, and it is not limited that step G4 needs to be performed after step G3; and second, a running situation of performing the method in the present invention in the second electronic device 22 to the fifth electronic device 25 is similar to the foregoing running situation in which the first electronic device 21 dominates and therefore is not described in detail.

Figure 6:
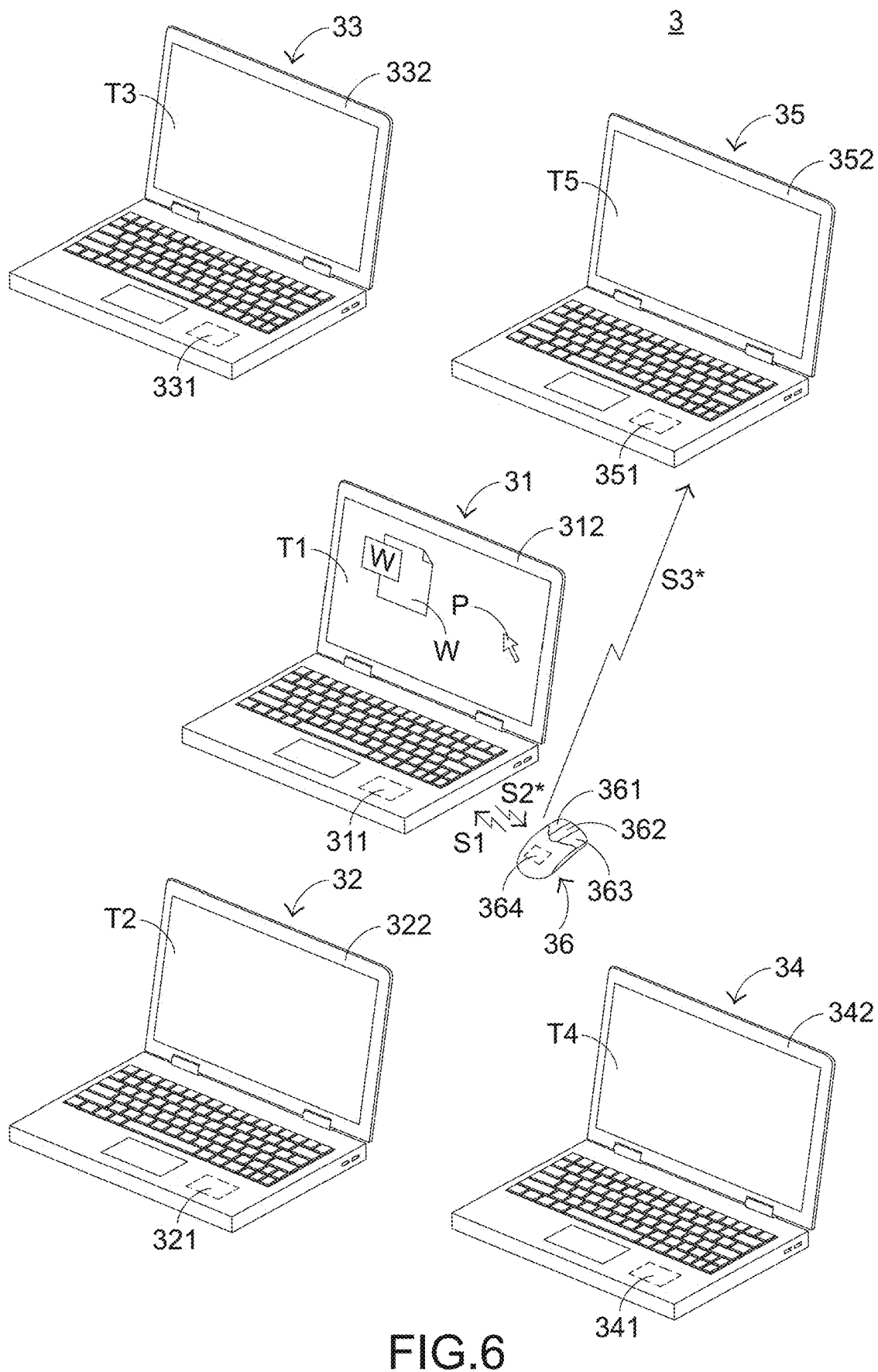
FIG. 6 is a schematic structural diagram of a cursor control system in a second preferred embodiment according to the present invention.

In addition, the present invention further provides a second preferred embodiment having a practice different from the foregoing one. Referring to FIG. 6, FIG. 6 is a schematic structural diagram of a cursor control system in a second preferred embodiment according to the present invention. The cursor control system 3 includes a first electronic device 31, a second electronic device 32, a third electronic device 33, a fourth electronic device 34, a fifth electronic device 35, and a mouse 36, and the mouse 36 includes a left button 361, a scroll wheel button 362, a right button 363, and a control unit 364. The first electronic device 31 includes a first cursor control module 311 and a first screen 312 capable of displaying a first working desktop T1. The second electronic device 32 includes a second cursor control module 321 and a second screen 322 capable of displaying a second working desktop T2. The third electronic device 33 includes a third cursor control module 331 and a third screen 332 capable of displaying a third working desktop T3. The fourth electronic device 34 includes a fourth cursor control module 341 and a fourth screen 342 capable of displaying a fourth working desktop T4. The fifth electronic device 35 includes a fifth cursor control module 351 and a fifth screen 352 capable of displaying a fifth working desktop T5. A structure of the cursor control system 3 is roughly the same as the structure of the foregoing cursor control system 2, similarities are not described in detail, and a difference lies in a cursor control method performed by the cursor control system 3.

Figure 7A:
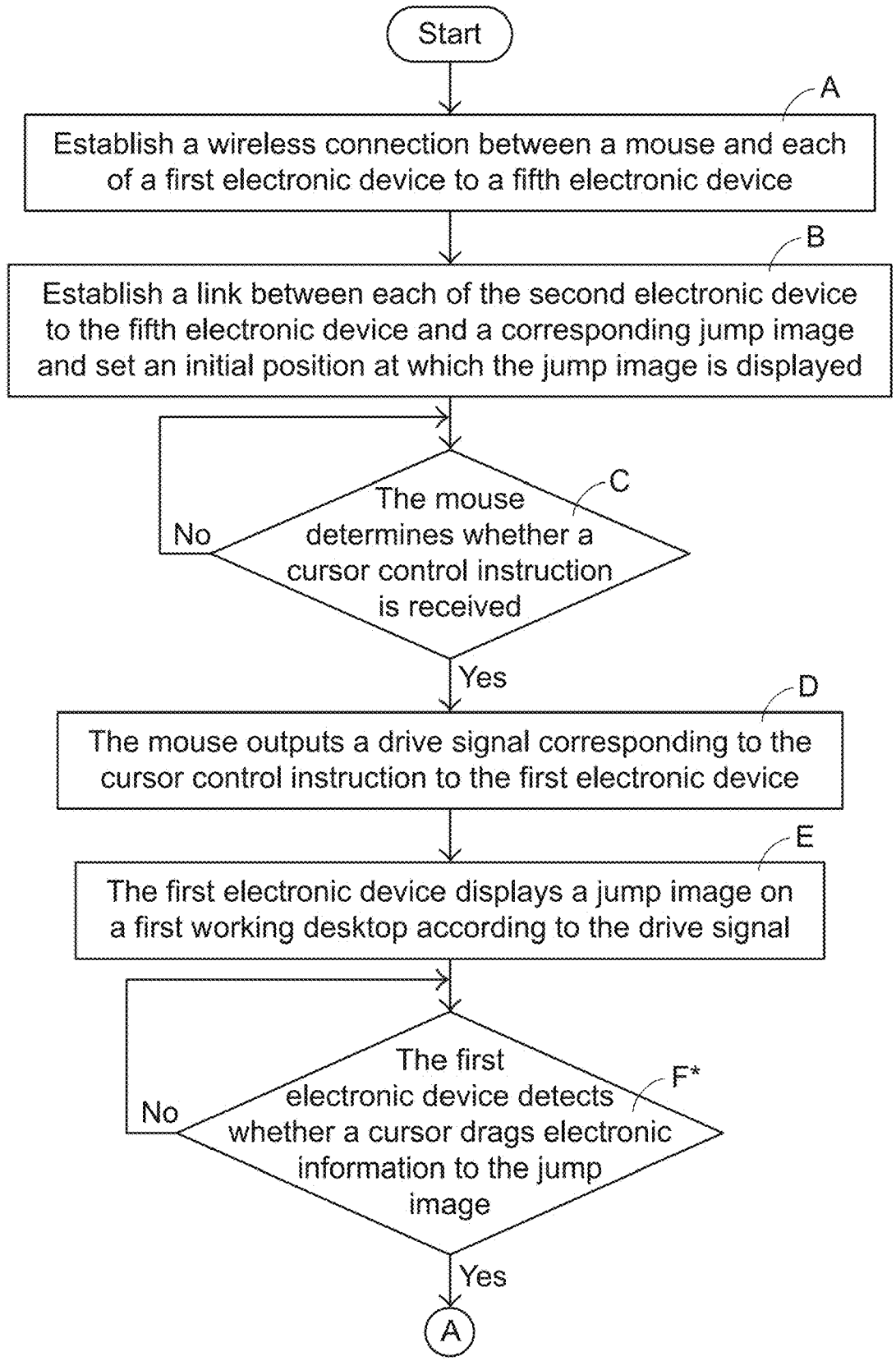
FIG. 7A and FIG. 7B are block flowcharts of a cursor control method in the second preferred embodiment according to the present invention.
Figure 7B:
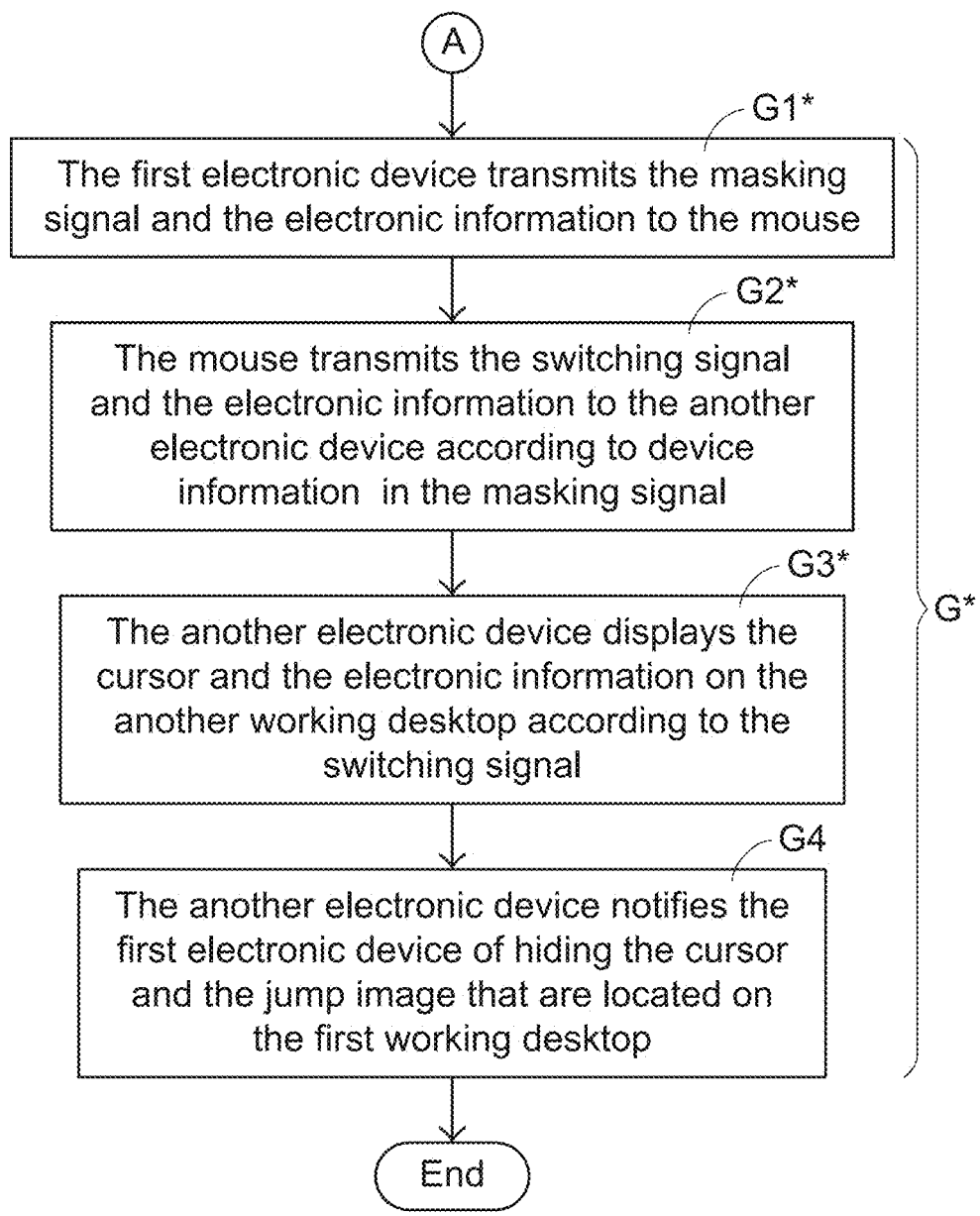
Figure 8:
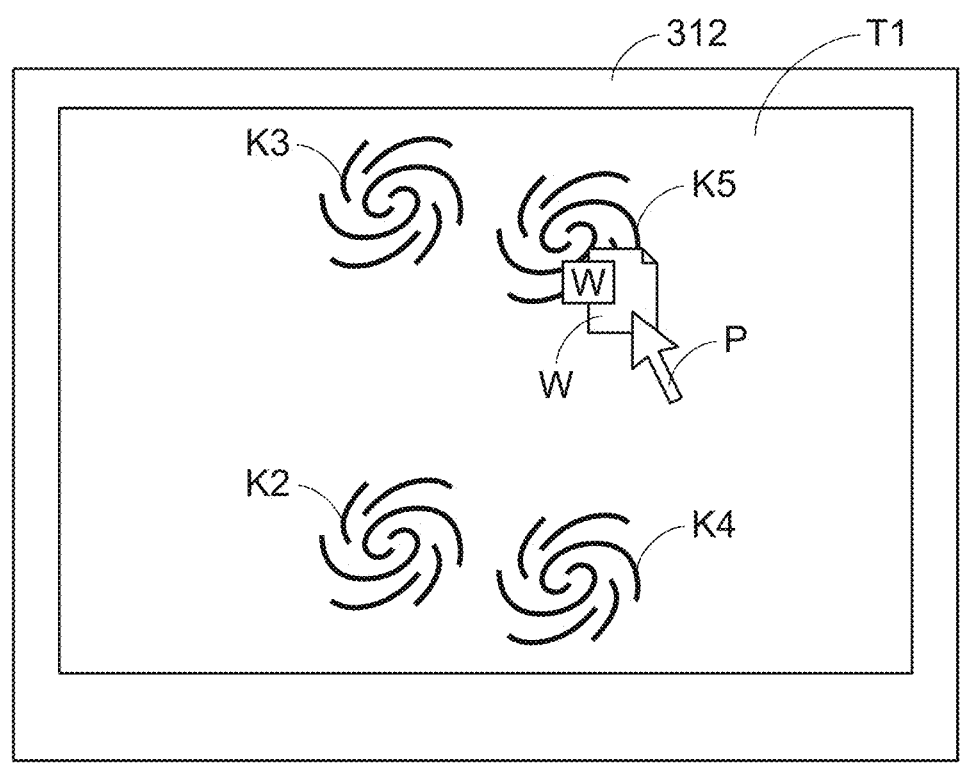
FIG. 8 is a schematic structural diagram of displaying a jump image on a first screen of the cursor control system in the second preferred embodiment according to the present invention.
Figure 9:
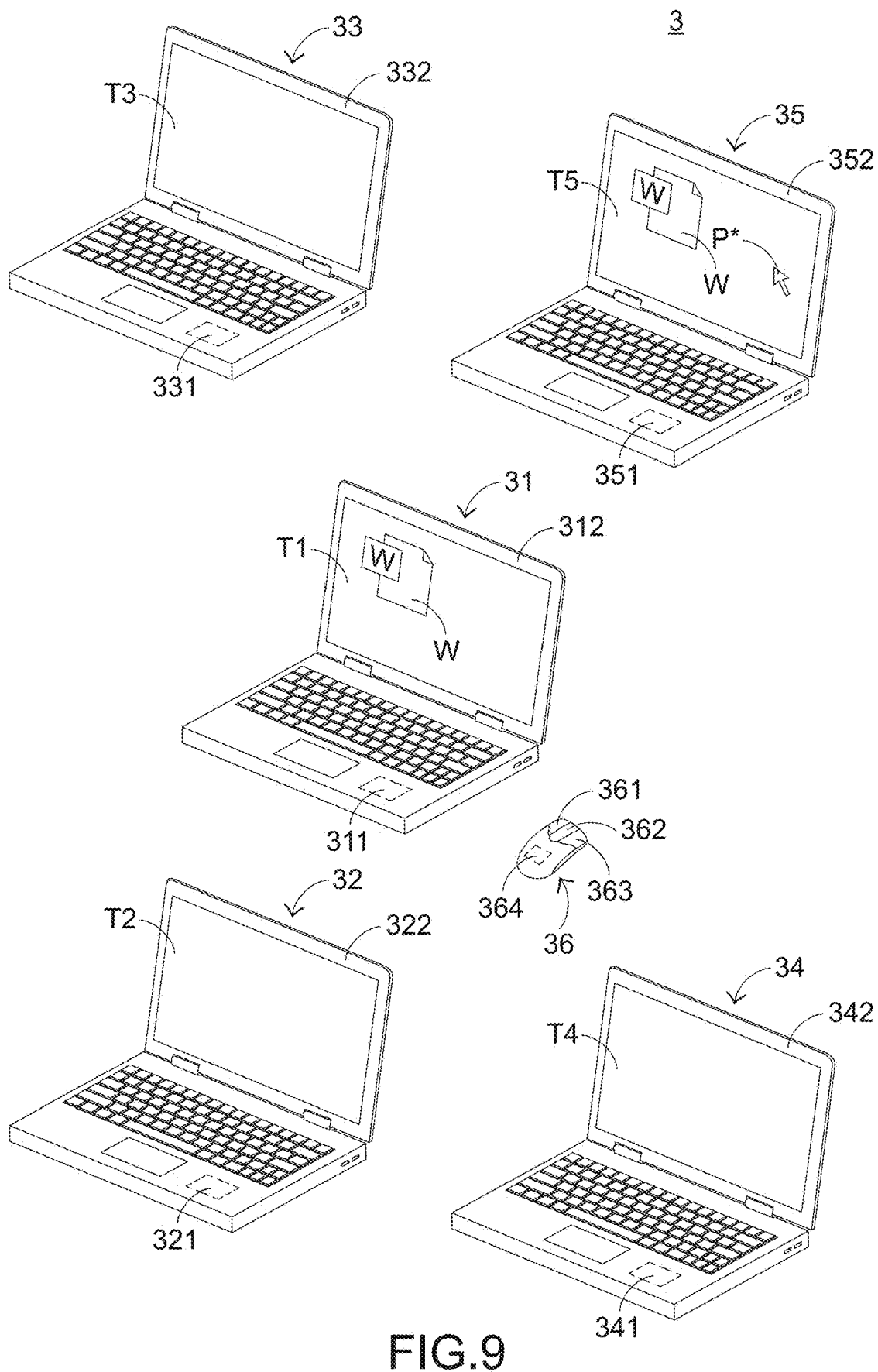
FIG. 9 is a schematic structural diagram of displaying a cursor on a second screen of the cursor control system in the second preferred embodiment according to the present invention.

The following describes the cursor control method performed by the cursor control system 3 of the present invention. Referring to FIG. 7A and FIG. 7B, FIG. 7A and FIG. 7B are block flowcharts of a cursor control method in the second preferred embodiment according to the present invention. The method of the present invention includes the following steps:

Step A: Establish a wireless connection between a mouse and each of a first electronic device to a fifth electronic device.

Step B: Establish a link between each of the second electronic device to the fifth electronic device and a corresponding jump image and set an initial position at which the jump image is displayed.

Step C: The mouse determines whether a cursor control instruction is received.

Step D: The mouse outputs a drive signal corresponding to the cursor control instruction to the first electronic device.

Step E: The first electronic device displays a jump image on a first working desktop according to the drive signal.

Step F*: The first electronic device detects whether a cursor drags electronic information to the jump image.

Step G*: The mouse transmits a switching signal to another electronic device according to a masking signal from the first electronic device, to display the cursor on another working desktop, and the first electronic device transmits the electronic information to the another electronic device.

Step G* includes the following steps:

Step G1*: The first electronic device transmits the masking signal and the electronic information to the mouse.

Step G2*: The mouse transmits the switching signal and the electronic information to the another electronic device according to device information in the masking signal.

Step G3*: The another electronic device displays the cursor and the electronic information on the another working desktop according to the switching signal.

Step G4: The another electronic device notifies the first electronic device of hiding the cursor and the jump image that are located on the first working desktop.

In step C, when it is determined that the mouse receives the cursor control instruction, perform step D; otherwise, perform step C again. In step F*, when the first electronic device detects whether the cursor drags the electronic information to the jump image, perform step G*; otherwise, perform step F* again.

The following describes a running situation of the cursor control system 3 of the present invention. Referring to all FIG. 6, FIG. 7A, FIG. 7B, and FIG. 8, FIG. 8 is a schematic structural diagram of displaying a jump image on a first screen of the cursor control system in the second preferred embodiment according to the present invention. FIG. 6 shows that electronic information W of the first electronic device 31 is located on the first working desktop T1. First, in the method of the present invention, step A to step E are performed, and running of step A to step E is completely the same as running in the foregoing preferred embodiments and therefore is not described in detail. After step E is completed, it can be seen from FIG. 8 that the plurality of jump images K2 to K5 is displayed on the first working desktop T1. Next, the first electronic device 31 performs step F*: Detect whether a cursor P drags the electronic information W to any one of jump images K2 to K5. In this preferred embodiment, the electronic information W is a text file.

When a user operates the mouse 36 to move the cursor P and drag the electronic information W to the jump image K5, the first electronic device 31 may perform step G*. An action that the cursor P is moved to the jump image K5 may be regarded as selecting, by the user, the jump image K3 corresponding to the third electronic device 33. Therefore, the first electronic device 31 generates a masking signal S2* corresponding to the fifth electronic device 35. Next, the first electronic device 31 performs step G1*: Transmit the masking signal S2* corresponding to the fifth electronic device 35 and the electronic information W to the mouse 36. Because the masking signal S2* contains device information corresponding to the fifth electronic device 35, after the mouse 36 receives the masking signal S2*, the control unit 364 of the mouse 36 performs step G2*: It is learned according to the device information in the masking signal S2* that an electronic device that needs to be wirelessly connected is the fifth electronic device 35; therefore, a switching signal S3* and the electronic information W are transmitted to the fifth electronic device 35.

Referring to all FIG. 6, FIG. 7A, FIG. 7B, and FIG. 9, FIG. 9 is a schematic structural diagram of displaying a cursor on a second screen of the cursor control system in the second preferred embodiment according to the present invention. Then, perform G3*: after the fifth electronic device 35 receives the switching signal S3* and the electronic information W, the fifth electronic device 35 displays a cursor P* and the electronic information W on the fifth working desktop T3 according to the switching signal S3*. At last, perform G4: the fifth electronic device 35 notifies the first electronic device 21 of hiding the cursor P and the plurality of jump images K2 to K5 that are located on the first working desktop T1. The method in the present invention is completed.

It should be noted that first, the electronic information W is not limited to a text file, may be a picture file, an audio/video file, or another file, or even may be a selected text, and the electronic information W may be wirelessly transmitted to another electronic device by means of the method of the present invention. Second, in this preferred embodiment, the electronic information W is transmitted to the fifth electronic device 35 by the first electronic device 31 through the mouse 36. This is only used as an example, and the present invention is not limited thereto. In another preferred embodiment, the following manner may be used: the first electronic device wirelessly transmits the masking signal to the mouse, so that the mouse learns of being wirelessly connected to the third electronic device, and the electronic information W is transmitted to the third electronic device by means of wireless connections between the first electronic device to the fifth electronic device.

It can be known according to the above that in the cursor control system and the cursor control method in the present invention, a plurality of jump images may be enabled on the first working desktop when a user has a need, and the cursor may be displayed on another corresponding working desktop only by moving the cursor to a jump image. It can be known by comparing the present invention with the conventional technology that in the cursor control system and the cursor control method of the present invention, the cursor does not need to be moved to a boundary of a working desktop. In other words, in the present invention, a distance for which the cursor needs to move may be shortened, to facilitate operation. In addition, in the cursor control system and the cursor control method of the present invention, a jump image may be used to wirelessly transmit electronic information, to replace a practice of transmitting electronic information by using a device such as a key drive.

Only preferred embodiments of the present invention are described in the above and are not intended to limit the claims of the present invention. Therefore, any other equivalent change or modification accomplished without departing from the spirit disclosed in the present invention shall all fall within the claims of this application.

What is claimed is:

1. A cursor control system, comprising:
    a first electronic device, comprising:
        a first cursor control module; and
        a first screen, used to display a first working desktop;
    a second electronic device, comprising:
        a second cursor control module; and
        a second screen, used to display a second working desktop; and
    a mouse, wirelessly connected to the first electronic device and the second electronic device and used to move a cursor on the first working desktop or the second working desktop, wherein the mouse has a control unit, used to receive a cursor control instruction to output a drive signal corresponding to the cursor control instruction to the first cursor control module or the second cursor control module, when the first cursor control module receives the drive signal, a jump image corresponding to the second working desktop is displayed on the first working desktop, and when the first cursor control module detects that the cursor is moved to the jump image, the first cursor control module transmits a masking signal to the mouse, so that the control unit transmits a switching signal to the second electronic device according to the masking signal, and the second cursor control module displays the cursor on the second working desktop according to the switching signal,
    wherein, the relative position relationship between said jump image and the cursor displayed on the first working desktop corresponds to the relative physical position relationship between said first electronic device and said second electronic device.

2. The cursor control system according to claim 1, wherein the second electronic device is located on a first side of the first electronic device, and when the first cursor control module is configured to, when receiving the drive signal, display the jump image at a position close to a first side of the cursor on the first working desktop.

3. The cursor control system according to claim 1, wherein the second cursor control module is configured to, when receiving the switching signal, display the cursor at a central position of the second working desktop.

4. The cursor control system according to claim 1, when after the cursor is displayed on the second working desktop, the second cursor control module transmits a notification signal to the mouse, and the control unit transmits the notification signal to the first electronic device, so that the first cursor control module hides the cursor and the jump image on the first working desktop according to the notification signal.

5. The cursor control system according to claim 1, wherein when electronic information in the first electronic device is dragged by the cursor to the jump image, the first cursor control module transmits another masking signal and the electronic information to the mouse, so that the control unit transmits the electronic information and another switching signal to the second electronic device according to the another masking signal, and the second cursor control module displays the cursor and the electronic information on the second working desktop according to the another switching signal.

6. The cursor control system according to claim 1, wherein the masking signal comprises device information corresponding to the second electronic device, so that the control unit transmits the switching signal to the second electronic device according to the device information.

7. A cursor control method, applied to a first electronic device, a second electronic device, and a mouse, wherein the cursor control method comprises the following steps:
(A) determining, by the mouse, whether a cursor control instruction is received;
(B) outputting, by the mouse, a drive signal corresponding to the cursor control instruction to the first electronic device;
(C) displaying, by the first electronic device according to the drive signal, a jump image corresponding to the second electronic device on a first working desktop corresponding to the first electronic device, wherein, the relative position relationship between said jump image and the cursor displayed on the first working desktop corresponds to the relative physical position relationship between said first electronic device and said second electronic device;
(D) detecting, by the first electronic device, whether the cursor is moved to the jump image; and
(E) transmitting, by the mouse, a switching signal to the second electronic device according to a masking signal from the first electronic device, so that the cursor is displayed on the second working desktop.

8. The cursor control method according to claim 1, before step (A), further comprising the following steps:
(F) establishing a wireless connection between the mouse and the first electronic device and establishing a wireless connection between the mouse and the second electronic device; and
(G) establishing a link between the second electronic device and the jump image, and setting an initial position at which the jump image is displayed.

9. The cursor control method according to claim 1, wherein step (E) comprises the following steps:
(E1) transmitting, by the first electronic device, a masking signal to the mouse;
(E2) transmitting, by the mouse, the switching signal to the second electronic device according to device information, corresponding to the second electronic device, in the masking signal;
(E3) displaying, by the second electronic device, the cursor on the second working desktop according to the switching signal; and
(E4) notifying, by the second electronic device, the first electronic device of hiding the cursor and the jump image that are located on the first working desktop.

10. A cursor control method, applied to a first electronic device, a second electronic device, and a mouse, wherein the cursor control method comprises the following steps:
(A) determining, by the mouse, whether a cursor control instruction is received;
(B) outputting, by the mouse, a drive signal corresponding to the cursor control instruction to the first electronic device;
(C) displaying, by the first electronic device according to the drive signal, a jump image corresponding to the second electronic device on a first working desktop corresponding to the first electronic device, wherein, the relative position relationship between said jump image and the cursor displayed on the first working desktop corresponds to the relative physical position relationship between said first electronic device and said second electronic device;
(D) detecting, by the first electronic device, whether the cursor drags electronic information to the jump image; and
(E) transmitting, by the mouse, a switching signal to the second electronic device according to a masking signal from the first electronic device, to display the cursor on the second working desktop, and transmitting, by the first electronic device, the electronic information to the second electronic device.

11. The cursor control method according to claim 10, before step (A), further comprising the following steps:
(F) establishing a wireless connection between the mouse and the first electronic device and establishing a wireless connection between the mouse and the second electronic device; and
(G) establishing a link between the second electronic device and the jump image, and setting an initial position at which the jump image is displayed.

12. The cursor control method according to claim 10, wherein step (E) comprises the following steps:
(E5) transmitting, by the first electronic device, a masking signal and the electronic information to the mouse;
(E6) transmitting, by the mouse, the switching signal and the electronic information to the second electronic device according to device information, corresponding to the second electronic device, in the masking signal;
(E7) displaying, by the second electronic device, the cursor and the electronic information on the second working desktop according to the switching signal; and
(E4) notifying, by the second electronic device, the first electronic device of hiding the cursor and the jump image that are located on the first working desktop.

13. The cursor control method according to claim 10, wherein step (E) comprises the following steps:
(E8) transmitting, by the first electronic device, a masking signal to the mouse and transmitting the electronic information to the second electronic device;
(E2) transmitting, by the mouse, the switching signal to the second electronic device according to device information, corresponding to the second electronic device, in the masking signal;
(E3) displaying, by the second electronic device, the cursor on the second working desktop according to the switching signal; and
(E4) notifying, by the second electronic device, the first electronic device of hiding the cursor and the jump image that are located on the first working desktop.

* * * * *